United States Patent
Ramu

(10) Patent No.: US 9,093,943 B2
(45) Date of Patent: Jul. 28, 2015

(54) HIGH POWER DENSITY SWITCHED RELUCTANCE MACHINES WITH HYBRID EXCITATION

(75) Inventor: Krishnan Ramu, Blacksburg, VA (US)

(73) Assignee: Regal Beloit America, Inc., Beloit, WI (US)

( * ) Notice: Subject to any disclaimer, the term of this patent is extended or adjusted under 35 U.S.C. 154(b) by 910 days.

(21) Appl. No.: 13/093,189

(22) Filed: Apr. 25, 2011

(65) Prior Publication Data

US 2011/0260672 A1 Oct. 27, 2011

Related U.S. Application Data

(60) Provisional application No. 61/327,829, filed on Apr. 26, 2010.

(51) Int. Cl.
*H02P 25/00* (2006.01)
*H02P 25/08* (2006.01)
*H02K 21/44* (2006.01)

(52) U.S. Cl.
CPC .............. *H02P 25/08* (2013.01); *H02K 21/44* (2013.01)

(58) Field of Classification Search
CPC ............ H02P 1/46; H02P 6/00; H02P 23/00; H02P 25/00; H02P 27/00
USPC .............. 318/700, 701; 310/10, 40 R, 46
See application file for complete search history.

(56) References Cited

U.S. PATENT DOCUMENTS

| | | | |
|---|---|---|---|
| 6,838,800 B2 | 1/2005 | Takao | |
| 7,015,615 B2 | 3/2006 | Ramu et al. | |
| 2005/0156475 A1* | 7/2005 | Ramu et al. | 310/166 |
| 2006/0087191 A1 | 4/2006 | Norell | |
| 2006/0273680 A1* | 12/2006 | Ramu et al. | 310/166 |
| 2009/0021089 A1 | 1/2009 | Nashiki | |
| 2009/0045768 A1* | 2/2009 | Ramu | 318/701 |
| 2009/0121583 A1 | 5/2009 | Smith | |
| 2009/0160391 A1* | 6/2009 | Flynn | 318/701 |
| 2010/0123426 A1* | 5/2010 | Nashiki et al. | 318/701 |
| 2010/0141061 A1* | 6/2010 | Ramu et al. | 310/46 |
| 2011/0193507 A1* | 8/2011 | Ramu | 318/400.15 |
| 2012/0104879 A1* | 5/2012 | Ramu | 310/43 |
| 2012/0104982 A1* | 5/2012 | Ramu | 318/400.4 |

OTHER PUBLICATIONS

C. Lee, R. Krishnan, and N. S. Lobo, "Novel Two-Phase Switched Reluctance Machine Using Common-Pole E-Core Structure: Concept, Analysis, and Experimental Verification," IEEE Trans. Ind. Appl., vol. 45, No. 2, pp. 703-711, Mar.-Apr. 2009.

(Continued)

*Primary Examiner* — Kawing Chan
(74) *Attorney, Agent, or Firm* — Armstrong Teasdale LLP

(57) ABSTRACT

A switched reluctance machine having salient stator and rotor poles. Alternating ones of the stator poles having windings and the others having permanent magnets attached on their pole faces. The alternate stator pole windings are provided with polarities that are suitable for unidirectional and bidirectional current operation of the switched reluctance machine. The alternate poles with permanent magnets in the switched reluctance machines can have also concentric windings placed on them and excited with currents to further augment the flux linkages in the stator poles. The windings on the poles with permanent magnets can be excited from the same source as the windings on the poles without permanent magnets to enhance power output or provide power factor correction.

17 Claims, 17 Drawing Sheets

(56) References Cited

OTHER PUBLICATIONS

C. Lee and R. Krishnan, "New designs of a two-phase e-core switched reluctance machine by optimizing the magnetic structure for a specific application: Concept, design, and analysis," IEEE Transactions on Industry Applications, vol. 45, No. 3, pp. 1804-1814, Sep.-Oct. 2009.

R, Krishnan, "Switched reluctance motor drives", CRC Press, Jun. 2001 (Book), pp. 1-7.

R. Krishnan, "Permanent magnet synchronous and brushless dc motor drives", CRC Press, Sep. 2009 (Book). pp. 38-46.

X. Luo, and T.A. Lipo, "Synchronous/permanent magnet hybrid AC machine," IEEE Transactions on Energy Conversion, vol. 15, No. 2, pp. 203-210, Jun. 2000.

R.P. Deodhar, S. Andersson, I. Boldea et al., "Flux-reversal machine: A new brushless doubly-salient permanent-magnet machine," IEEE Transactions on Industry Applications, vol. 33, No. 4, pp. 925-934, Jul.-Aug. 1997.

Ishak, Z. Q. Zhu, and D. Howe, "Comparative study of permanent magnet brushless motors with all teeth and alternative teeth windings," IEE Conference Publication. pp. 834-839, Mar.-Apr. 2004.

International Search Report dated Oct. 19, 2011.

Written Opinion of the International Searching Authority dated Oct. 4, 2011, pp. 1-7.

\* cited by examiner (a)

(b)

HIGH POWER DENSITY SWITCHED RELUCTANCE MACHINES WITH HYBRID EXCITATION

This application claims the priority benefit of U.S. provisional application 61/327,829 filed on Apr. 26, 2010, the entire content of which is incorporated here by reference.

FIELD OF THE INVENTION

The invention relates to increasing the torque and power output of a switched reluctance machine (SRM), having windings on alternate stator poles, by augmenting the stator flux with permanent magnets placed directly on the stator poles that have no stator windings. The invention also relates to an SRM having windings on all of its stator poles and permanent magnets only on the alternate stator poles, so as to increase the stator flux, torque, and power output. The invention further relates to unidirectional and bidirectional current operation of an SRM with permanent magnets on alternate stator poles having no windings on them. Still further, the invention relates to unidirectional and bidirectional current operations of an SRM having windings on all poles but permanent magnets only on alternate poles.

BACKGROUND OF THE RELATED ART

A switched reluctance machine (SRM) is well known in literature and its principle, theory of operation, and construction are described in R. Krishnan, "Switched Reluctance Motor Drives", CRC Press, 2001. An SRM has windings on its stator poles and no windings or magnets on the rotor poles or rotor slots. SRMs are ideal for high torque, are highly fault-tolerant, are highly efficient, and have high thermal operating conditions. Recently, machines with SRM e-core structures (see Cheewoo Lee, R. Krishnan, and N. S. Lobo, "Novel Two-Phase Switched Reluctance Machine Using Common-Pole E-Core Structure: Concept, Analysis, and Experimental Verification," IEEE Trans. Ind. Appl., vol. 45, no. 2, pp. 703-711, March-April 2009) and SRMs with unexcited common poles (see C. Lee and R. Krishnan, "New designs of a two-phase e-core switched reluctance machine by optimizing the magnetic structure for a specific application: Concept, design, and analysis," IEEE Transactions on Industry Applications, vol. 45, no. 3, pp. 1804-1814, September-October 2009) have been introduced with high power density and high efficiency operation. In the SRM e-core structure and SRM with unexcited common poles, maximum efficiency has been extracted from an electromagnetic point of view. To increase torque density of an SRM further, a structural change in its stator or rotor cores or windings is not sufficient; other means must be used to obtain much higher power density and greater efficiency. One way to achieve higher power density is to focus on the excitation augmentation in a stator with permanent magnets (PMs). Such augmentation of the excitation must bestow the fundamental operational characteristics of the SRM so as to maintain the attractive features of: (1) dc excitation; (2) simplicity, with regard to the minimum number of power semiconductor devices employed to control current in a power electronic circuit; (3) absence of shoot-through faults; (4) high fault tolerance, (5) utilization of reluctance torque; and (6) high efficiency operation (see see R. Krishnan, "Switched reluctance motor drives", CRC Press, 2001).

Many machine implementations have been in practice, such as one with PMs in a stator back iron (see R. Krishnan, "Permanent magnet synchronous and brushless dc motor drives", CRC Press, 2009 and X. Luo, and T. A. Lipo, "Synchronous/permanent magnet hybrid AC machine," IEEE Transactions on Energy Conversion, vol. 15, no. 2, pp. 203-210, 2000) to exploit the structural properties of an SRM. Placing PMs in a stator back iron creates operation that is not that of a switched reluctance machine drive system, but is that of a PM brushless direct current (dc) motor drive system, which causes the loss of the best operational features of SRMs while embracing only the standard features of a PM brushless dc motor (PMBDC) drive system. Different schemes for realizing an SRM with PMs in the stator are provided in detail in R. Krishnan, "Permanent magnet synchronous and brushless dc motor drives", CRC Press, 2009, and briefly described here. Broadly, three kinds of PMs superimposed on SRM structures can be seen in the literature; they are: (1) PMs in a back iron of a stator, (2) PMs on stator pole faces, and (3) PMs embedded in the middle of stator poles.

FIG. 1 illustrates a machine 100 with PMs 101 and 102 disposed within a stator back iron 104. PMs 101, 102 aid the flux arising from stator pole excitations. An SRM of this type is known in literature as a PM SRM or doubly-salient PM machine. The reversal of excitation currents in stator pole windings 103 will produce flux with polarity that is opposite to the flux from PMs 101, 102. The opposite polarities of flux causes flux cancellation, due to opposing magneto-motive force. Flux produced by the stator current excitation passes through adjacent stator poles, resulting in greater flux leakage. The reluctance variation for the phase becomes smaller leading to smaller reluctance torque. Therefore, the main torque produced is primarily the synchronous torque of the machine. The doubly-salient PM machine behaves like a PM synchronous machine or, what is sometimes referred to in the literature, a PM brushless dc machine. PMs 101, 102 equivalently replace PMs in a rotor of a conventional PMBDC machine, with no apparent difference in performance.

FIG. 2 illustrates a single-phase machine 200 having two PMs disposed on the face of each stator pole. FIG. 3 illustrates a three-phase machine 300 with PMs disposed on the pole faces. The structures of FIGS. 2 and 3 support flux reversal in the back iron 205 of machines 200, 300 (see R. P. Deodhar, S. Andersson, L. Boldea et al., "Flux-reversal machine: A new brushless doubly-salient permanent-magnet machine," IEEE Transactions on Industry Applications, vol. 33, no. 4, pp. 925-934, 1997). Machines 200, 300 are referred to as flux reversal machines.

In machines 200 and 300, PMs 201 and 202 are installed on the face of each stator pole 203. PMs 201, 202 are magnetized along the radial direction of machine 200's and machine 300's rotors 204. Each stator pole 203 has two magnets 201, 202 that are half the width of the pole arc. Net flux in each stator pole 203 is the sum of the flux due to the windings and the flux of the PMs. Only half of the stator pole face is utilized by the flux when stator windings 206 are excited. The wide face of each stator pole, as illustrated in FIGS. 2 and 3, increases the difficulty of manually wrapping windings on the poles and automated winding insertion is expensive.

FIG. 4 illustrates a three-phase machine 400 having PMs embedded in the middle of each stator pole (see D. Ishak, Z. Q. Zhu, and D. Howe, "Comparative study of permanent magnet brushless motors with all teeth and alternative teeth windings," IEE Conference Publication, pp. 834-839, 2004). PMs 401 are embedded in the center of poles 402 along the radial direction of rotor 403. The magnetization of each PM 401 is along the circumferential direction of machine 400. The performance of machine 400 is similar to that for flux reversal machines 200, 300. Machine 400 is referred to as flux switching machine (FSM) in literature. The operation of an FSM is the same as that of a PM synchronous machine, and the stator windings are excited with three-phase alternating currents. FSMs have no reluctance torque and, thus, no relationship to SRM operation or characteristics.

In summary, doubly-salient PM machines, flux reversal machines, and FRMs: (i) are fundamentally alternating current (ac) machines, (ii) have PMs embedded in the stator instead of in the rotor, as is conventional, (iii) allow flux reversal in the stator poles to varying degrees, and (iv) have an SRM structure of salient stator and rotor poles, but function solely as PM synchronous or brushless dc machines, as they have very negligible reluctance torques.

FIG. 5 illustrates an SRM 500 having four excitation poles 501, 502, 503, and 504, two poles for each of two phases. Phase A employs excitation poles 501, 502, and Phase B employs excitation poles 503, 504. SRM 500 has windings 505 on each of excitation stator poles 501, 502, 503, 504. Diametrically opposite excitation pole windings constitute a phase winding. SRM 500 has a common pole 506 sandwiched between each pair of adjacent excitation poles 501, 502, 503, 504. Thus, SRM 500 has four common poles 506 and four excitation poles 501-504. When phase A is excited, flux: (1) enters excitation pole 501; (2) is conveyed to back iron 507; (3) passes through each common pole 506 adjoining excitation pole 501, (4) enters the air gap (i.e., the space existing between a rotor pole and its nearest stator or common pole at any instant) between the common pole conveying the flux and its nearest rotor pole 508; (5) enters the nearest rotor pole 508; (6) enters rotor back iron 509; (7) enters a rotor pole nearest excitation pole 501; (8) enters the air gap between excitation pole 501 and its nearest rotor pole; and (9) is conveyed back to excitation pole 501. The main flux in excitation pole 501 splits between left- and right-side common poles 506 and likewise for excitation pole 502 of phase A.

The purpose of each common pole 506 is to carry the flux produced by the individual excitation pole nearest to the common pole and route it back to the excitation pole via the air gap, rotor pole, adjoining rotor back iron, rotor pole, and air gap. The same applies to phase B operation in the SRM. From the above-discussion, it may be inferred that the flux in the common poles does not reverse, regardless of which phase is conducting. The excitation poles experience no reversal of flux, as they are excited only with unidirectional current. Common poles 506 serve to carry the flux generated by excitation poles of both phases.

Flux generated in machine 500 is solely due to the excitation of phase windings 505 on excitation poles 501-504. A challenge facing machine 500 is that the starting torque at an unaligned position of the rotor and stator poles is not very high.

SUMMARY OF THE INVENTION

Objects of the invention include:
1. achieving the fundamental behavior of a switched reluctance machine (SRM) in torque generation, i.e., the SRM's predominant torque production must be from variable reluctance of the machine;
2. achieving the fundamental structure of an SRM both in its stator and rotor shape and form, i.e., with double saliency retained;
3. no windings and no permanent magnets (PMs) on rotor poles of the SRM;
4. a stator with laminations having multiple poles, some of the stator poles carry windings (i.e., excitation poles) and the remainder having no windings (i.e., common poles);
5. PMs on stator poles and magnetized in the radial direction with parallel or radial orientation;
6. small thickness PMs on stator poles;
7. PMs of remnant flux density that retain magnetism and are made of ferrite, neodymium, samarium cobalt, or any other rare earth element;
8. PMs only on stator pole faces, either fully or partially covering the pole faces or on the sides of the poles along the stator pole height;
9. PMs only on stator poles that are not wound with coils for excitation;
10. unidirectional current excitation of SRM stator windings;
11. the magnetic flux in stator excitation poles and stator common poles remains in the same direction, with no flux reversal in the stator back iron and stator poles, when stator windings are excited with unidirectional current, magnetic flux;
12. common poles carry flux of PMs as well as part of flux generated by excitation poles, without any reversals or cancellations in the same direction when excitation poles of one phase or any other phase are excited;
13. high efficiency and high torque;
14. significant torque, at lower currents and lower load torques, due to PM excitation;
15. little effect from PMs at nominal operating load torque and higher torques, so as to operate like an SRM; and
16. highly-enhanced torque-per-unit-current at low and high torques.

A further object of the invention is to provide a path for excitation flux, when excitation current is reversed, so that stator pole flux due to current excitation and PM flux are not additive. The path for stator flux is through main excitation poles of the same phase.

Still further, an object of the invention is to have no leakage paths in a machine's back iron. Alternating current (ac) operation of the excitation windings is possible without PM flux opposing stator excitation pole flux and with only reluctance torque contributing to the dominant torque. The PM flux aids the stator excitation poles flux and at no time do they oppose each other.

These and other objects of the invention may be achieved, in full or part, by a stator having: (1) multiple excitation poles, each of which has an inductive winding disposed thereon; (2) a common pole that has a permanent magnet but no inductive winding disposed thereon; and (3) a stator back that electromagnetically interconnects the common pole and each excitation pole.

The above-mentioned and other objects of the invention may be achieved, in full or part, by a stator having: (1) multiple poles, each of which has an inductive winding disposed thereon and fewer than all of the poles have a permanent magnet disposed thereon; and (2) a stator back that electromagnetically interconnects the poles.

The above-mentioned and other objects of the invention may be achieved, in full or part, by an SRM having N excitation phases, N an integer greater than 0. The SRM has: (1) multiple stator poles associated with each of the N excitation phases, each stator pole having an inductive winding disposed thereon for receiving current of the associated excitation phase; (2) for each of the N excitation phases, a first permanent magnet disposed on each of fewer than all of the stator poles associated with the excitation phase; and (3) a stator back that electromagnetically interconnects all of the stator poles.

The above-mentioned and other objects of the invention may be achieved, in full or part, by a switched reluctance machine having: (1) a stator with: (a) multiple excitation poles, each of which has an inductive winding disposed thereon; (b) multiple common poles, each of which has a permanent magnet but no inductive winding disposed thereon; and (c) a stator back that electromagnetically interconnects the common pole and each excitation pole; and (2) a rotor that cooperates electromagnetically with the stator. The excitation and common poles are disposed around the stator with respect to one another such that when unidirectional currents: (a) are passed through the inductive windings to induce fluxes in the same radial direction from the rotor to the excitation poles or (b) are not passed through the inductive windings: (i) the fluxes flowing through the stator are unidirectional and never reverse direction, (ii) the fluxes flowing through the common poles are unidirectional and never reverse direction, and (iii) the induced fluxes and the fluxes generated by the permanent magnets are additive, without a negating effect on one another.

The above-mentioned and other objects of the invention may be achieved, in full or part, by an SRM having: (1) a stator with: (a) four excitation poles per phase, each of the excitation poles has an inductive winding disposed thereon, the windings for a pair of the excitation poles for each phase configured so as to produce fluxes through their respective excitation poles in a direction opposite to that produced by the windings for the other pair of the excitation poles of the phase, when a current is passed through the four windings of the phase; (b) common poles, each of which has a permanent magnet but no inductive winding disposed thereon, the number of common poles being equal to the number of excitation poles; and (c) a stator back that electromagnetically interconnects the common and excitation poles; and (2) a rotor that cooperates electromagnetically with the stator. The flux directions are determined with respect to a radial direction of the excitation poles toward the rotor. The excitation and common poles are disposed around the stator with respect to one another such that when the windings of any one phase are excited by passing an alternating current through these phase windings: (i) the fluxes generated by the excited windings and the fluxes generated by the permanent magnets are additive, without a negating effect on one another, for each direction the alternating current flows, and (ii) flux reversal through the common poles does not occur.

The above-mentioned and other objects of the invention may be achieved, in full or part, by a method of operating a switched reluctance machine (SRM), the SRM having: (a) a rotor, (b) a stator having multiple poles, each of which has an inductive winding disposed thereon and fewer than all of the poles have a permanent magnet disposed thereon; and (c) a stator back that electromagnetically interconnects the poles. The method including: (1) inducing flux within the SRM by passing current through one or more of the inductive windings that is not disposed on a stator pole having a permanent magnet thereon; and (2) inducing flux within the SRM by passing current through one or more of the inductive windings disposed on a stator pole having a permanent magnet thereon so as to correct a power factor applied to the SRM or enhance torque production of the SRM.

The above-mentioned and other objects of the invention may be achieved, in full or part, by a method of operating a switched reluctance machine (SRM) having N excitation phases, N an integer greater than 0, the SRM having: (a) multiple stator poles associated with each of the N excitation phases, each stator pole having an inductive winding disposed thereon for receiving current of the associated excitation phase; (b) for each of the N excitation phases, a first permanent magnet disposed on each of fewer than all of the stator poles associated with the excitation phase; (c) a stator back that electromagnetically interconnects all of the stator poles; and (d) multiple inductive windings disposed around the stator back, each of the stator back windings positioned between two of the poles associated with an excitation phase of the excitation phases, wherein for each of the stator back windings, one of the two poles has the first magnet disposed thereon and the other of the two poles does not have a first magnet disposed thereon. The method including: (1) exciting one phase of the SRM by passing current through the windings disposed on stator poles associated with the phase; and (2) exciting the stator back windings by passing current through them to correct a power factor of the SRM.

DETAILED DESCRIPTION OF THE INVENTION

Figure 6:
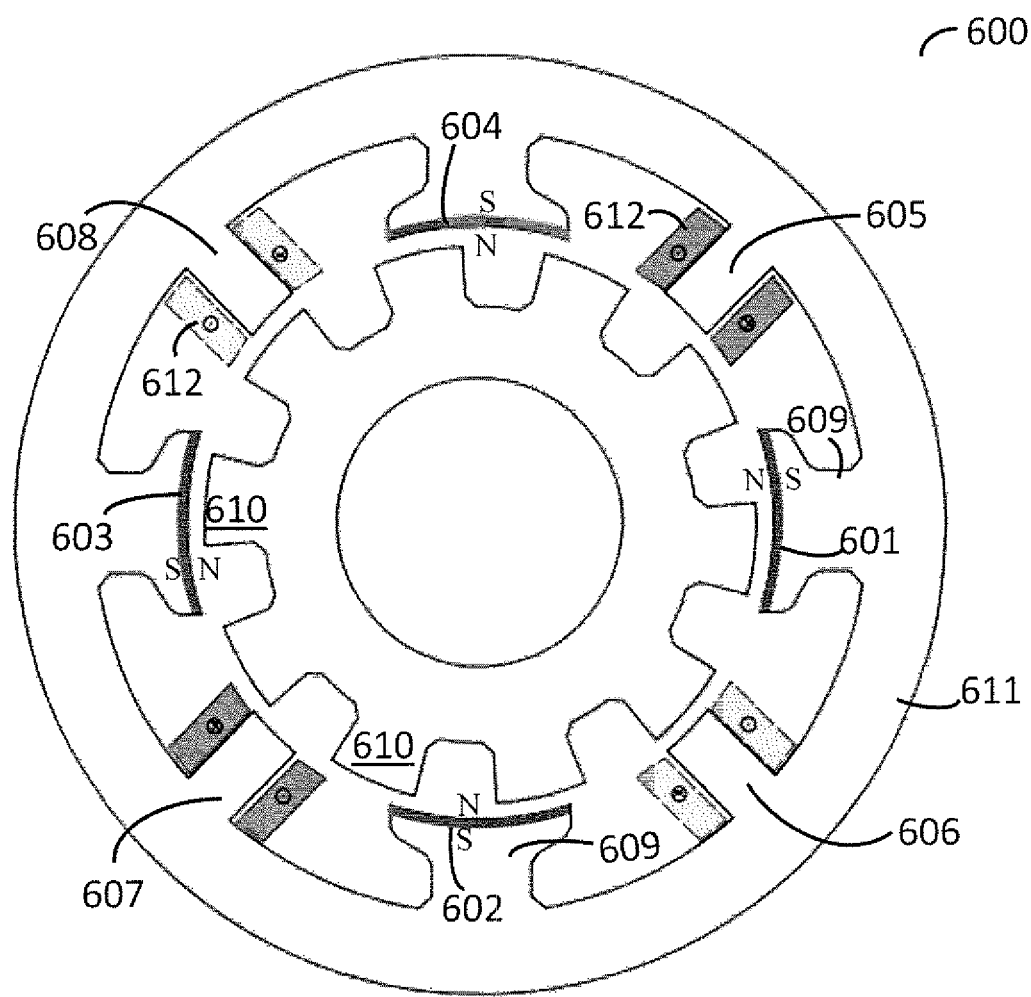
FIG. 6 illustrates a machine having PMs disposed on the faces of a stator's common poles.

FIG. 6 illustrates a machine 600 having permanent magnets (PMs) disposed on the faces of a stator's common poles. A PM 601, 602, 603, 604 is mounted on the face of each of common poles 609 with south poles forming the base and north poles directly facing rotor poles 610 and the air gaps in between. Excitation poles 605-608 all generate and conduct flux away from the air gap existing between the rotor and stator poles, into the excitation poles, and then into stator back iron 611. The polarities of current excitations (dot indicating current coming out and star indicating current going in the conductors) are shown in windings 612 around excitation stator poles 605-608. The PM flux goes to the adjacent excitation poles of both phases under normal conditions, when excitation poles 605-608 are not energized. A dominant portion of the PM flux passes through the excited excitation pole.

For example, exciting phase-A winding on excitation stator poles 605, 607 will draw the flux from common pole PMs 601-604 to excitation poles 605, 607. Thus, PM flux is harnessed to augment the flux generated by the excitation poles. The flux linkage of the stator excitation phases are enhanced with flux from the PMs. When the excited phase's flux linkages are enhanced as a function of stator excitation current for each rotor position, torque generated in the air gap increases. The increase in torque can be seen from fundamentals of electro-mechanics (see chapter 2 of R. Krishnan, "Switched reluctance motor drives", CRC Press, 2001).

When machine 600's stator windings 612 are unexcited, the flux in machine 600 is due to PMs 601-604. The flux and flux linkage of the stator windings may be derived considering linear material characteristics. When a pair of diametrically opposite rotor poles are completely unaligned between stator poles, flux linkage is a minimum and will increase linearly with increasing excitation of the stator winding on the excitation pole. The flux linkages versus stator current characteristics will be a straight line having a small slope. The straight line flux linkage is very much similar to SRM characteristics except that SRM unaligned position flux linkages versus stator current characteristic will have a slightly smaller slope than machine 600. As rotor poles 610 are moved from the completely unaligned position to complete alignment with stator poles 605-608, the flux linkages versus stator current characteristics follow the shape of the magnetization (B-H) characteristics of machine 600's steel laminations.

The flux linkage contribution of PMs 601-604 and stator phase winding excitation flux produce a larger area in the flux linkage characteristics as compared to an SRM without PMs. The difference in the area enclosed between: (1) the flux linkages versus stator current curve and (2) such characteristics at a position where the stator and rotor poles are completely out of alignment, identifies the work done for each operational cycle of a phase. The area enclosed between the flux linkages versus stator current curve is much larger than that of an SRM without PMs in the pole faces and explains the higher torque generating capability of the SRM with PMs in the pole faces.

Machine 600 produces cogging torque, which is a disadvantage, but cogging does not detract machine 600's ability to generate higher torque than conventional PM machines. Torque generation is enhanced in machine 600 because the PM flux is governed by excitation poles 601-604. By itself, the PM flux is divided between the excitation poles adjacent to the PM. PM flux focus is achieved by the excitation of a pole on either side of the common pole where the PM is embedded. Focusing of the PM flux also makes the flux flow unidirectionally, as both the PM and excitation fluxes have the same polarity and are in series. Absence of flux reversal reduces core losses in the stator laminations and contributes to an increase in efficiency.

The flux path of machine 600 is shortened by comparison to an SRM with four stator poles and two, six, eight, or ten rotor poles. In a four-pole, two-phase SRM, the entire stator back iron has flux flowing whereas in machine 600, only half of stator back iron 611 has flux flowing. Only half the back iron carrying flux at any time amounts to no core losses in the other half of the stator back iron. Only half the stator and rotor back irons carry flux and, therefore, contribute to lower losses and higher efficiency compared to conventional SRMs where the entire stator and rotor back irons carry the flux.

So as to operate machine 600 with an alternating current (ac) power electronic converter, it is necessary only to change the stator pole winding polarities. The stator pole winding polarities of the phases must be changed so that the flux produced by one of the excitation poles goes through the other excitation pole of the same phase.

Figure 7:
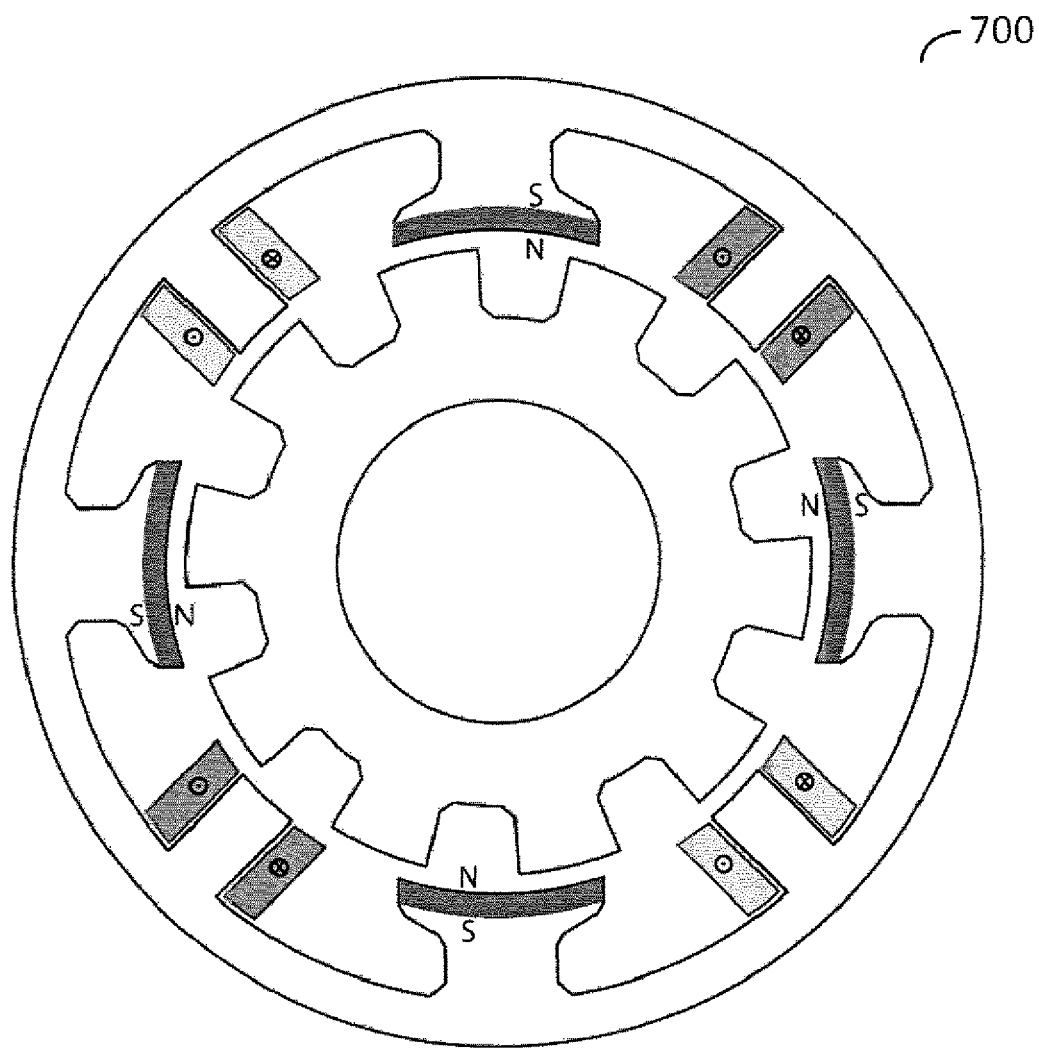
FIG. 7 illustrates the machine of FIG. 6 with stator pole winding polarities of the phases changed so that the flux produced by one of the excitation poles goes through the other excitation pole of the same phase.

FIG. 7 illustrates the machine of FIG. 6 with stator pole winding polarities of the phases changed so that the flux produced by one of the excitation poles goes through the other excitation pole of the same phase. Note that there is direct cancellation of flux in electric machines with PMs in the back iron, like those described in the Background of the Related Art section of this disclosure. The direct cancellation of flux forces the excitation pole's flux to be reduced and diverted via the remaining stator poles, thus diminishing the torque generation due to reluctance variation. The addition of flux achieved with machine 700 is a great advantage compared to conventional machines.

Figure 8:
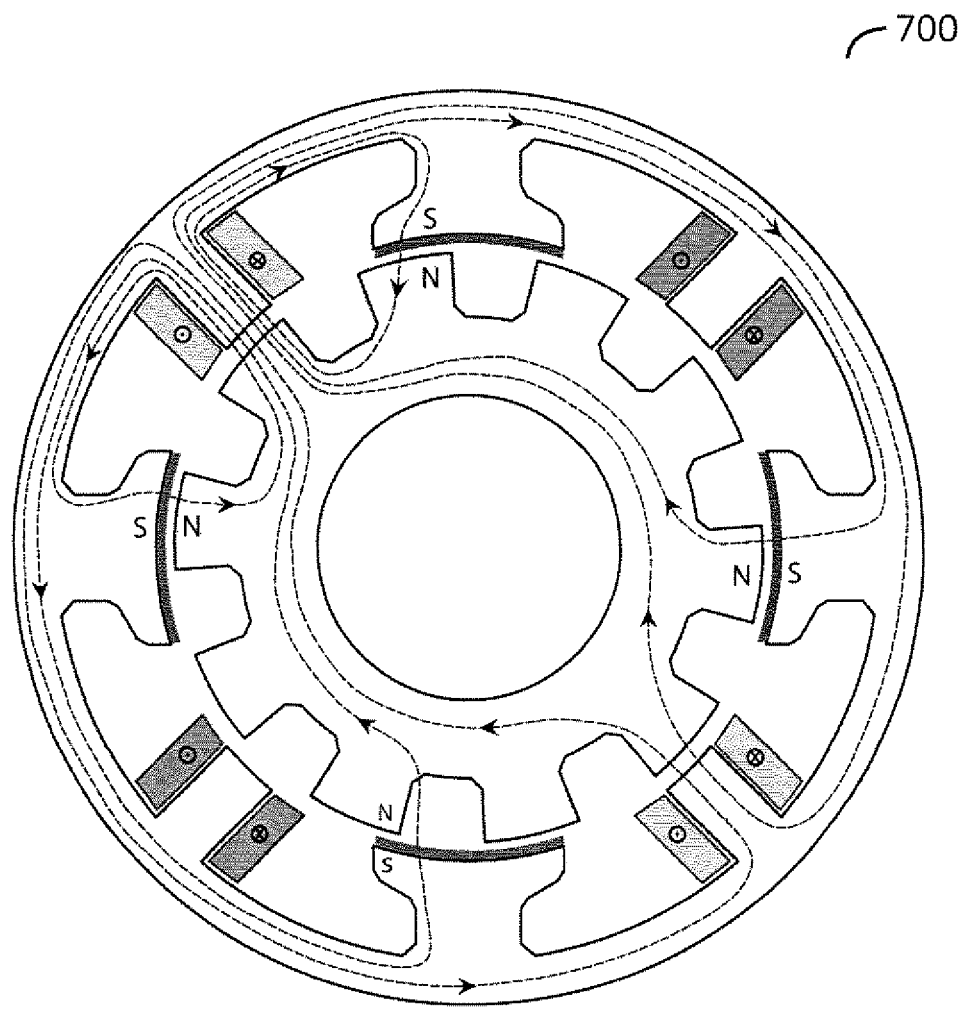
FIG. 8 illustrates the closed flux path created by phase B excitation of the machine illustrated in FIG. 7.

FIG. 8 illustrates the closed flux path created by phase B excitation of the machine illustrated in FIG. 7. The PM flux passes through to the top pole of phase B. The excitation pole flux for the bottom pole of phase B also closes its path through the top phase-B pole, through respective air gaps, rotor poles, rotor back iron, stator poles, and stator back iron. Flux from PM poles and excited stator poles leak to excitation poles of phase A. There is a slight crowding of flux in the top pole compared to the bottom pole of any excited phase, which may create an unbalanced normal (i.e., radial) force. The unbalanced radial force may be compensated for by having four excitation poles per phase, rather than two excitation poles per phase.

Increasing the number of rotor poles will also increase the number of common poles with PMs on them. If the number of excitation poles per phase and common poles with PMs is increased such that diametrically opposite excited poles each experience flux crowding, the net normal force can be made zero. With zero net normal force, stator acceleration and noise generation in the machine can be minimized.

The flux produced by the excitation poles of the phases add together and do not have to find another path as in the synchronous machines described in X. Luo, and T. A. Lipo, "Synchronous/permanent magnet hybrid AC machine," IEEE Transactions on Energy Conversion, vol. 15, no. 2, pp. 203-210, 2000. The additive flux makes the magnetic circuit highly efficient.

Two PMs in the stator back iron are sufficient in the PM SRM described in X. Luo, and T. A. Lipo, "Synchronous/permanent magnet hybrid AC machine," IEEE Transactions on Energy Conversion, vol. 15, no. 2, pp. 203-210, 2000, whereas machines 600, 700 require a minimum of four PMs. The number of PMs is the same as the number of excitation poles if a contiguous stator lamination is required. If the PMs have to be put in the back iron, instead of in the common stator poles, at least 8 PMs would be required. Thus, machines 600, 700 reduce the number of PMs relative to that of a conventional machine. Placing PMs in the back irons of machines 600, 700 would also result in no flux reversals in the common poles, stator back iron, and excitation poles.

Figure 9:
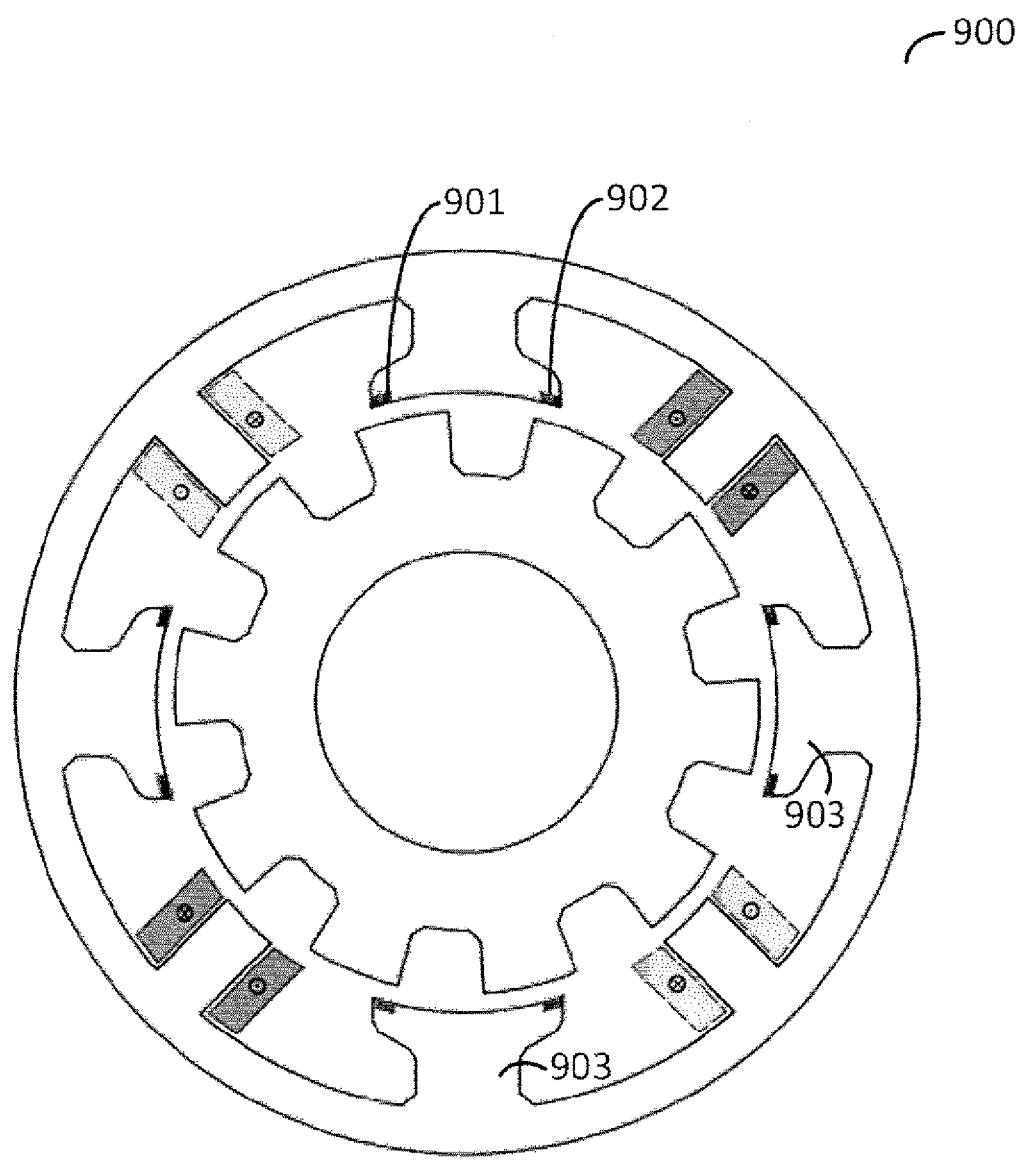
FIG. 9 illustrates a machine having small magnets along the axial lengths of common poles.

FIG. 9 illustrates a machine 900 having small magnets along the axial lengths of common poles. Small magnets 901, 902 cover only a portion of the face of common poles 903, so as to reduce the size of the PMs. Small magnets 901, 902 are easy to insert and are flush with the pole contour. Variations of magnet placements shown in machine 900 are possible in and around common poles 903, such as in the faces of common poles 903 or along the radial part of each base of common poles 903. Small magnets 901, 902 may cover the entire facial arc of common poles 903 or some portion thereof.

Figure 10:
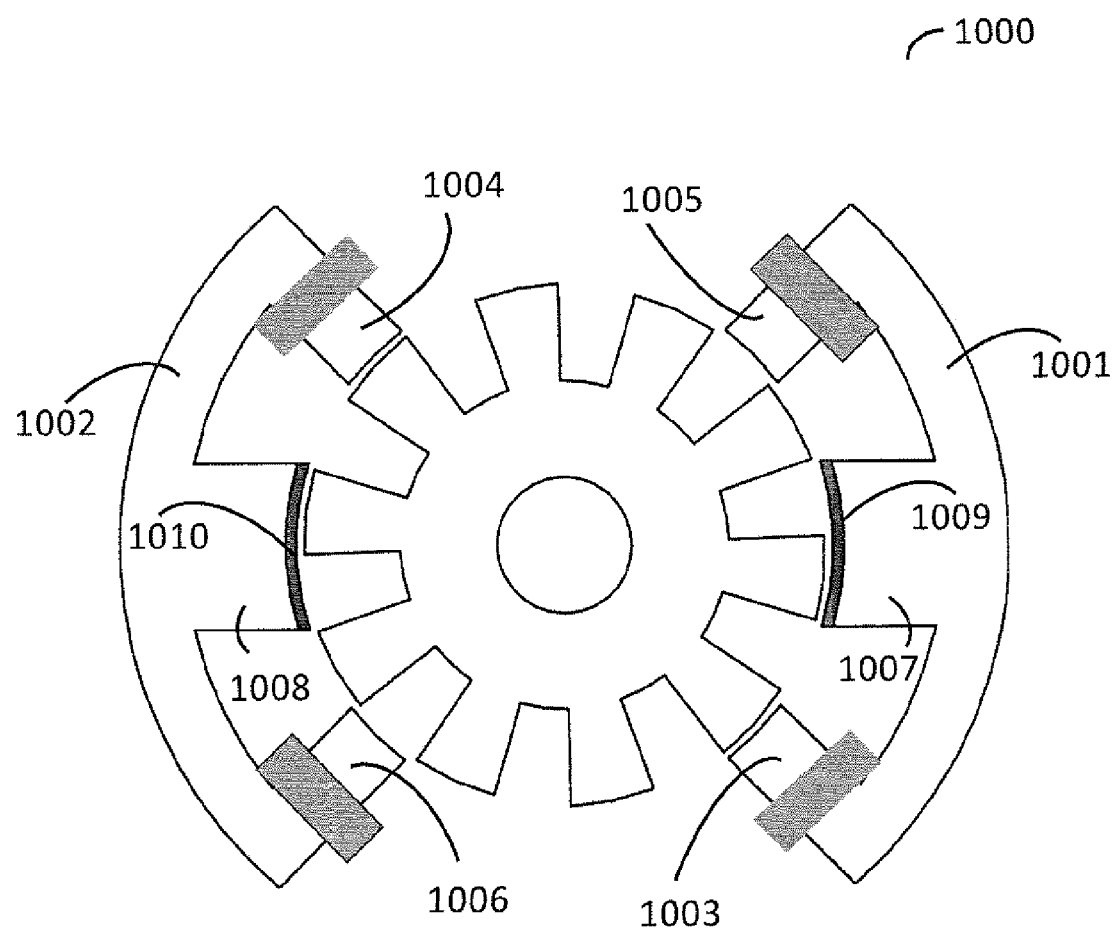
FIG. 10 illustrates a machine having a stator formed by two modular and separate segments.

FIG. 10 illustrates a machine 1000 having a stator formed by two modular and separate segments. Each E-shaped modular segment 1001, 1002 has two excitation poles 1003-1006 and one common pole 1007, 1008. Each modular segment 1001, 1002 has one excitation pole for phase A 1003, 1004 and one for phase B 1005, 1006. By connecting the windings of respective phases in series or parallel from modular segments 1001, 1002, phase A and B windings are realized. Common poles 1007, 1008 have PMs 1009, 1010 in their pole faces. The flux of PMs 1009, 1010 is steered to the phase poles by the excitation of the respective phase windings in the poles. The functioning of SRM 1000 is similar to the SRM with E-core described in Cheewoo Lee, R. Krishnan, and N. S. Lobo, "Novel Two-Phase Switched Reluctance Machine Using Common-Pole E-Core Structure: Concept, Analysis, and Experimental Verification," IEEE Trans. Ind. Appl., vol. 45, no. 2, pp. 703-711, March-April 2009. Machine 1000 reduces the stator iron and packaging of a machine.

Figure 11:
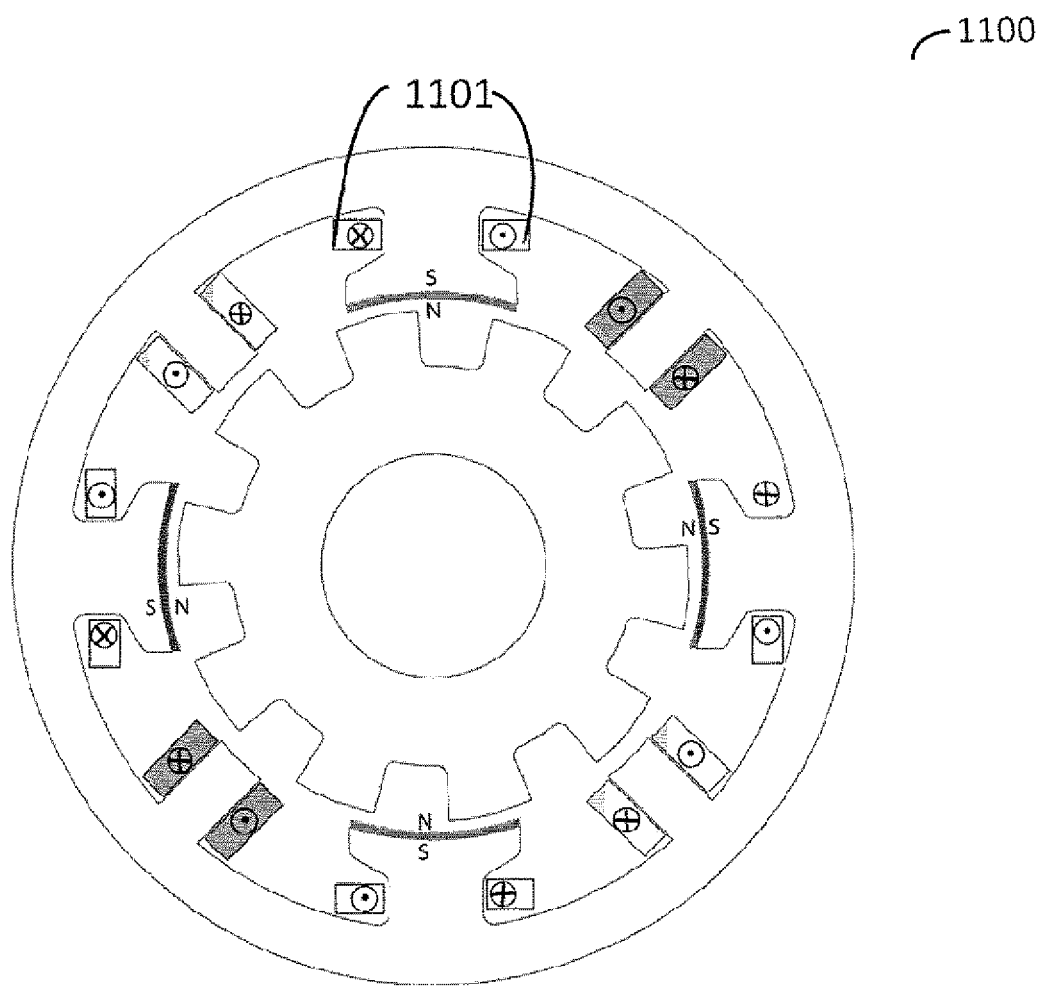
FIG. 11 illustrates a modification of the machine illustrated in FIG. 6 in which windings are disposed around each common pole.

FIG. 11 illustrates a modification of the machine illustrated in FIG. 6 in which windings are disposed around each common pole. Power factor correction (PFC) windings 1101 of machine 1100 may be excited by a switched, rectified ac current from an ac supply with the aid of a power electric circuit. PFC windings 1101 may be used in the stead of an inductor within a PFC circuit. Common poles 1101 carry the flux due to rectified currents in the PFC windings and thereby augment the excitation pole flux, thus generating increased torque. PFC windings 1101 serve to: (1) provide a physical inductor for PFC and (2) enhance torque generation with the flux created by the inductor windings on the common poles. Additionally, with machine 1100: (1) no separate lamination core is required for winding inductor 1101; (2) no separate space for packaging inductor 1101 is required as is required for conventional power PFC circuits, with the result that the electronic package of the PFC circuit may be smaller; and (3) cooling of inductor 1101 is integrated with the cooling of the motor, thus replacing cooling management of two separate entities (i.e., motor and inductor) with only one, that of the motor.

Figure 12:
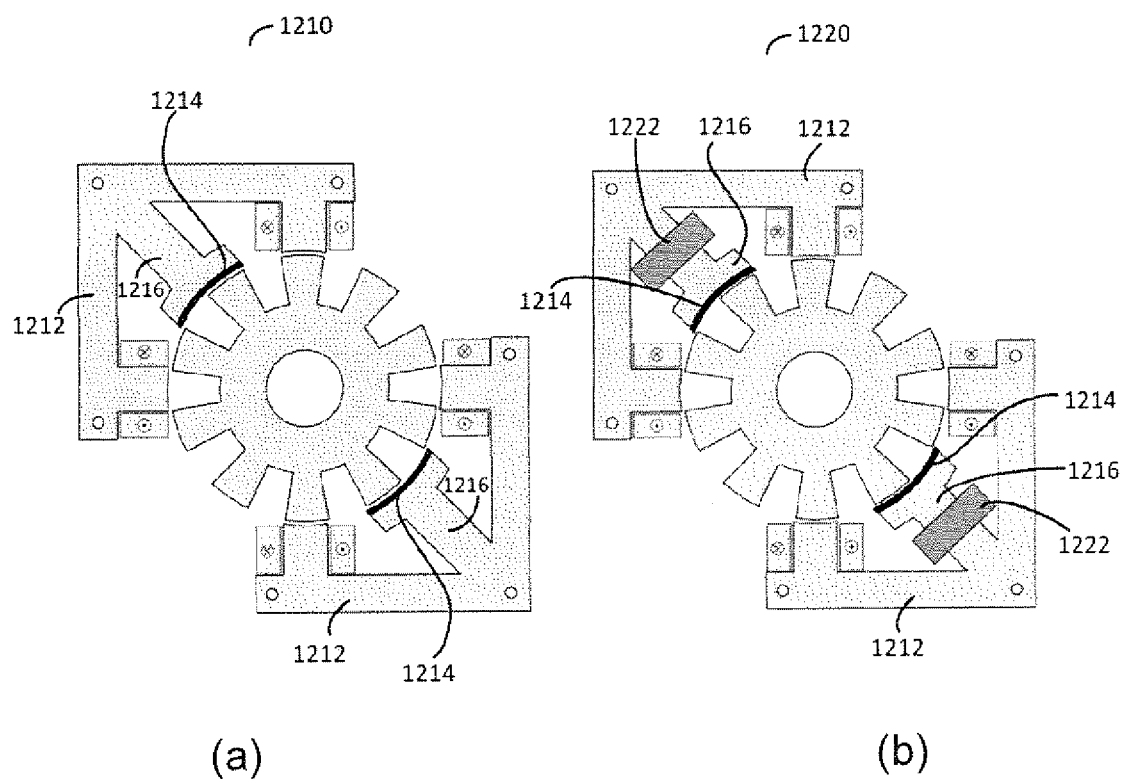
FIGS. 12(a) and 12(b) illustrate machines having modular and separate L-shaped stator segments.

FIGS. 12(*a*) and 12(*b*) illustrate machines 1210 and 1220 having modular and separate L-shaped stator segments. Each of machines 1210, 1220 has L-shaped stator segments 1212. PMs 1214 are disposed on the faces of common poles 1216 for each of machines 1210 and 1220. Machine 1220 differs from machine 1210 in that the former has windings 1222 disposed on common poles 1216.

Figure 13:
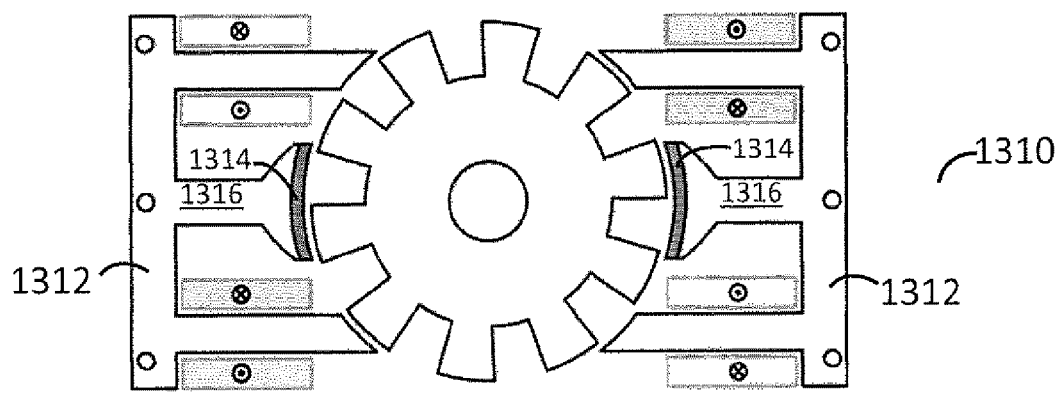
FIGS. 13(a) and 13(b) illustrate machines having I-shaped modular and separate stator segments.
Figure 13:
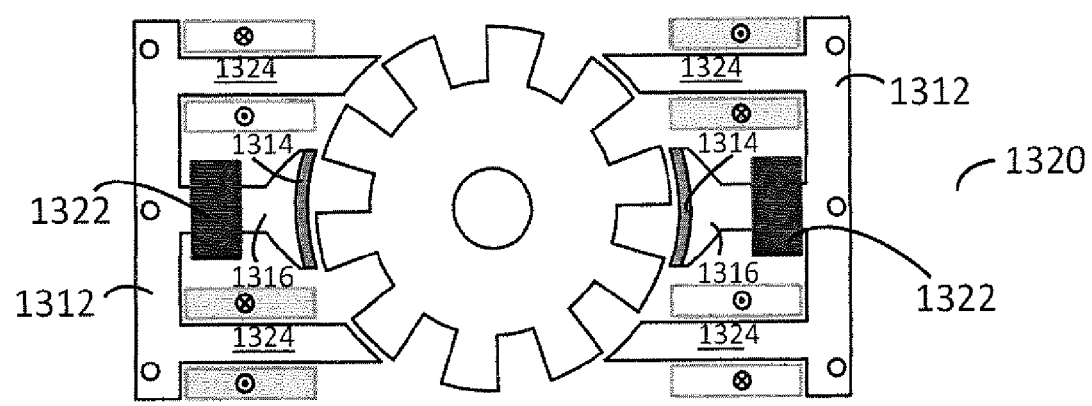

FIGS. 13(*a*) and 13(*b*) illustrate machines 1310 and 1320 having I-shaped modular and separate stator segments. Each of machines 1310, 1320 has I-shaped stator segments 1312. PMs 1314 are disposed on the faces of common poles 1316 for each of machines 1310 and 1320. Machine 1320 differs from machine 1310 in that the former has windings 1322 disposed on common poles 1316. Windings 1322 on common poles 1316 are disposed to look differently from those on excitation poles 1324 of phases A and 13. Windings 1322 around common poles 1316 may be used to enhance the excitation of common poles 1316 and as inductors for power factor correction.

Machines 1000, 1210, 1220, 1310, and 1320 may be realized without continuity in stator lamination. Despite the discontinuity in the stator lamination, machines 1000, 1210, 1220, 1310, and 1320 produce torque mainly contributed by reluctance variation. Therefore, these machines are controlled as a standard SRM drive system and any of the converter topologies for SRMs can be used for current control of the phase windings.

Machines 1000, 1210, 1220, 1310, and 1320 do not need to have two stator modules, as one module is sufficient to actuate the rotor. With more than one stator module, failure of one or more modules but not all modules ensures fault tolerant operation, provided phase windings in the modules are separate from each other and controlled separately with power converters.

For machines 1220 and 1320, windings 1222 and 1322 may be used both as an inductor for PFC and to augment the flux generated by the PMs and excitation poles. The additional flux generates higher torque, while providing PFC and drawing near sinusoidal current from an ac supply that delivers power for actuating the motor. Power stages involved in feeding the motor from the ac supply lines are: (1) ac to direct current (dc) rectification with control for power factor correction and (2) dc to controlled voltage/current to the motor phases.

The ac excitation of the phases of machines 1000, 1210, 1220, 1310, and 1320 is very similar to that for machine 1100, as described herein. H-bridge converters can be used for ac excitation of the windings, similar to the inverters used for the control of ac machines, with or without a split dc link.

Figure 14:
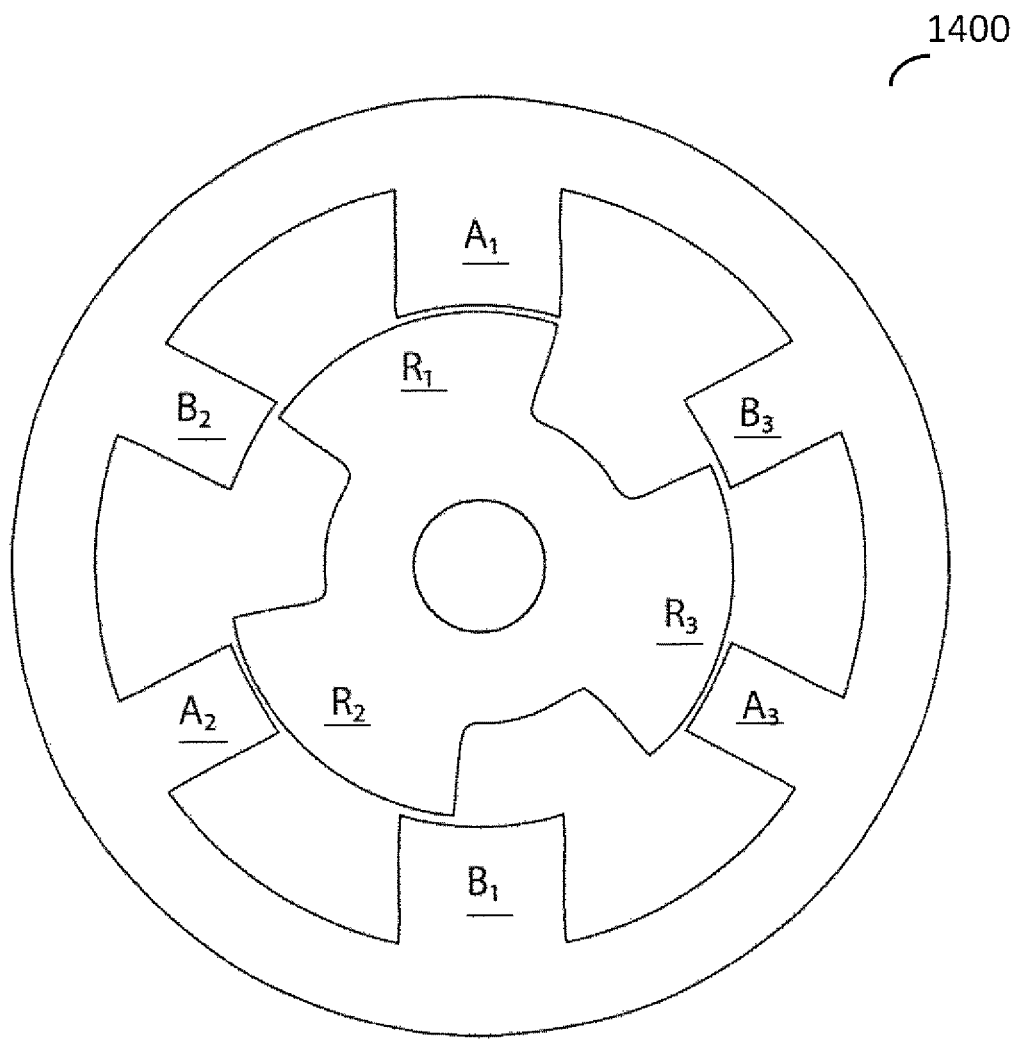
FIG. 14 illustrates a related art machine having three stator poles per phase.

FIG. 14 illustrates a related art machine 1400 having three stator poles per phase. Phase A employs three stator poles A1, A2 and A3. When exciting stator poles A1, A2, and A3 of phase A, half the flux from stator pole A1 goes through the air gap between stator pole A1 and a rotor pole R1, rotor pole R1, the back iron between rotor pole R1 and a rotor pole R2, rotor pole R2, the air gap between rotor pole R2 and stator pole A2, and the stator back iron between stator poles A1 and A2 before returning to stator pole A1. Likewise, the other half of the flux from stator pole A1 goes through rotor pole R1, the back iron between rotor pole R1 and a rotor pole R3, rotor pole R3, the air gap between rotor pole R3 and stator pole A3, stator pole A3, and the stator back iron between stator poles A1 and A3 before returning to stator pole A1.

Stator pole A1 has twice the number of winding turns (not illustrated) and twice the cross-sectional area across its pole face as do stator poles A2 and A3; the phase-B poles are likewise configured. The winding polarities can be in such a direction that no flux reversals occur in the back iron, as discussed in Krishnan Ramu and Nimal Savio Lobo, "Apparatus and method that prevent flux reversal in the stator back material of a two-phase SRM (TPSRM)", U.S. Pat. No. 7,015,615 B2, Mar. 21, 2006.

Figure 1:
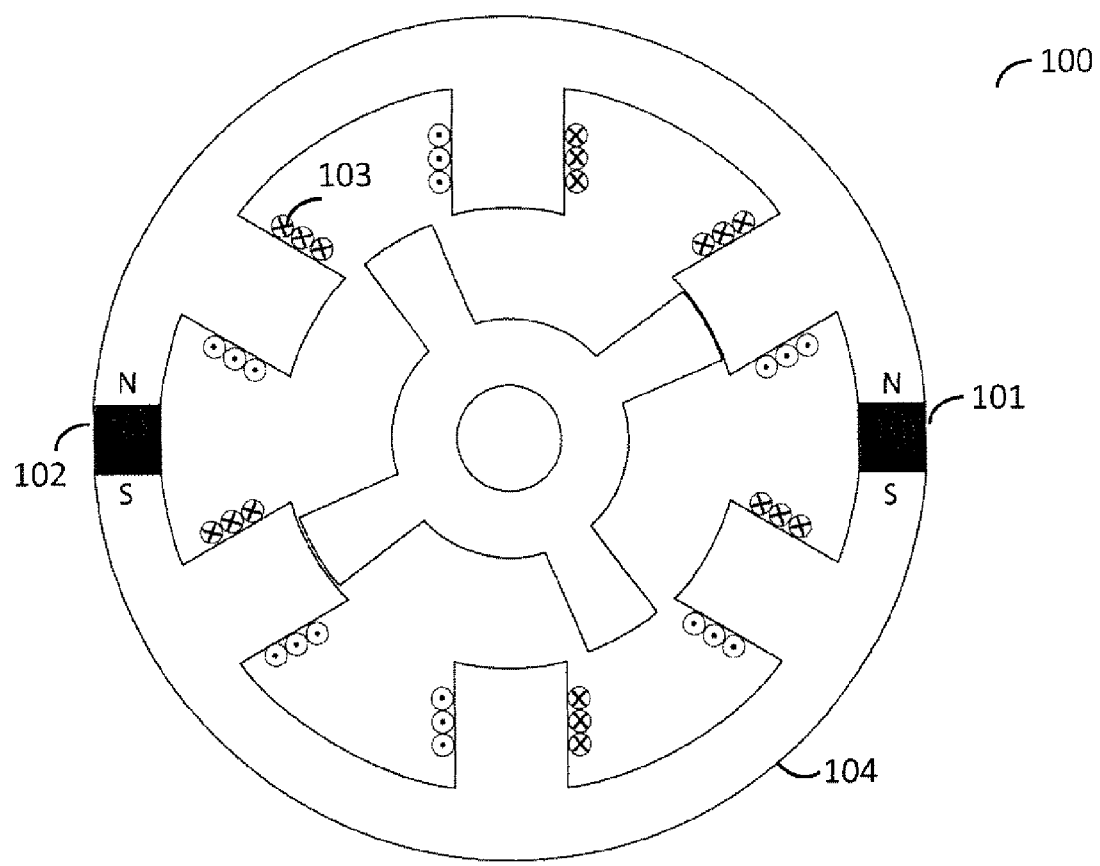
FIG. 1 illustrates a related art machine with permanent magnets (PMs) disposed within a stator back iron.
Figure 2:
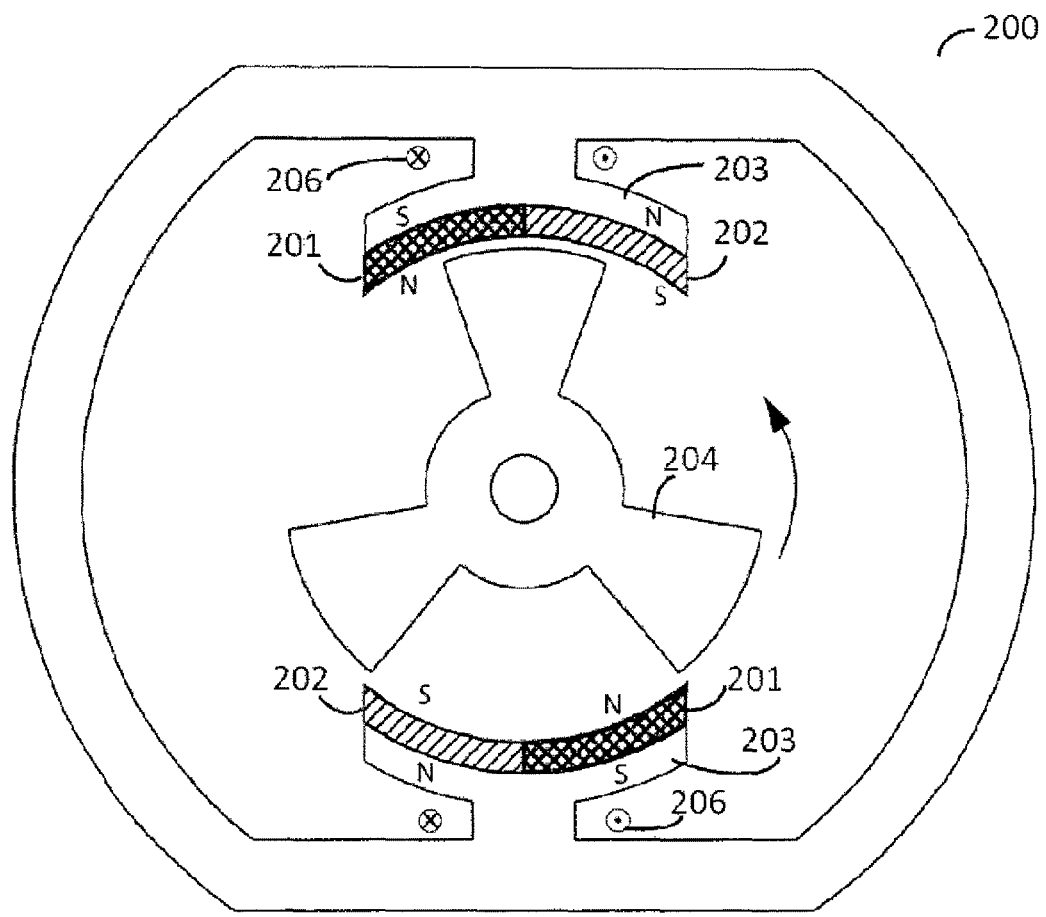
FIG. 2 illustrates a related art single-phase machine having two PMs disposed on the face of each stator pole.
Figure 3:
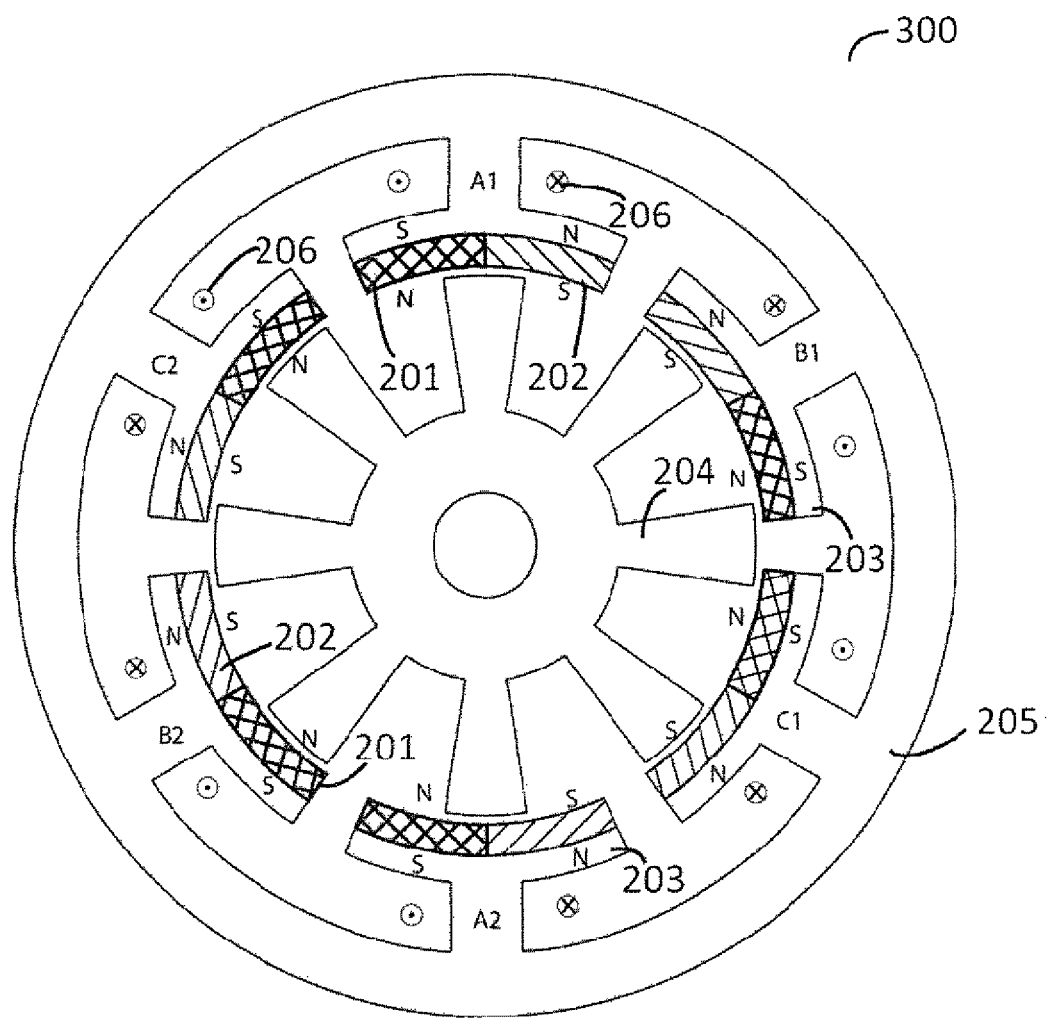
FIG. 3 illustrates a related art three-phase machine with PMs disposed on the pole faces.
Figure 4:
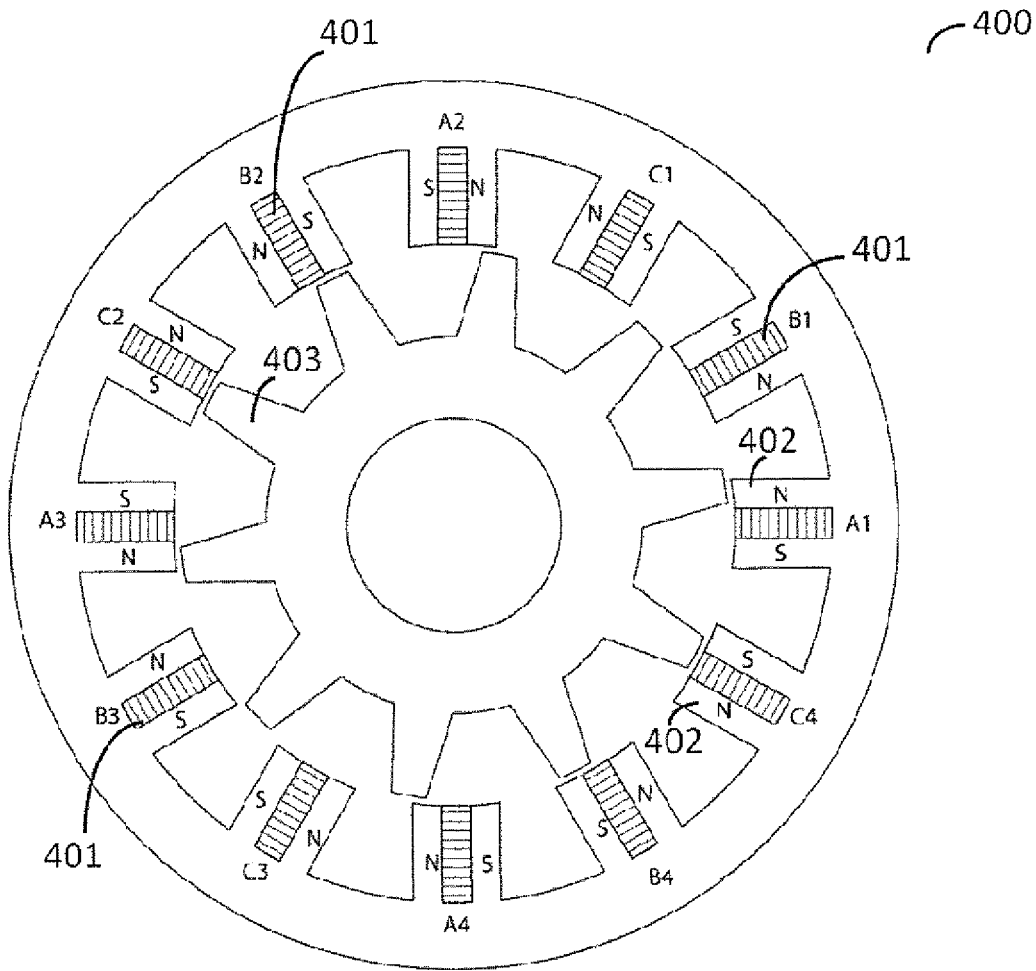
FIG. 4 illustrates a related art three-phase machine having PMs embedded in the middle of each stator pole.
Figure 5:
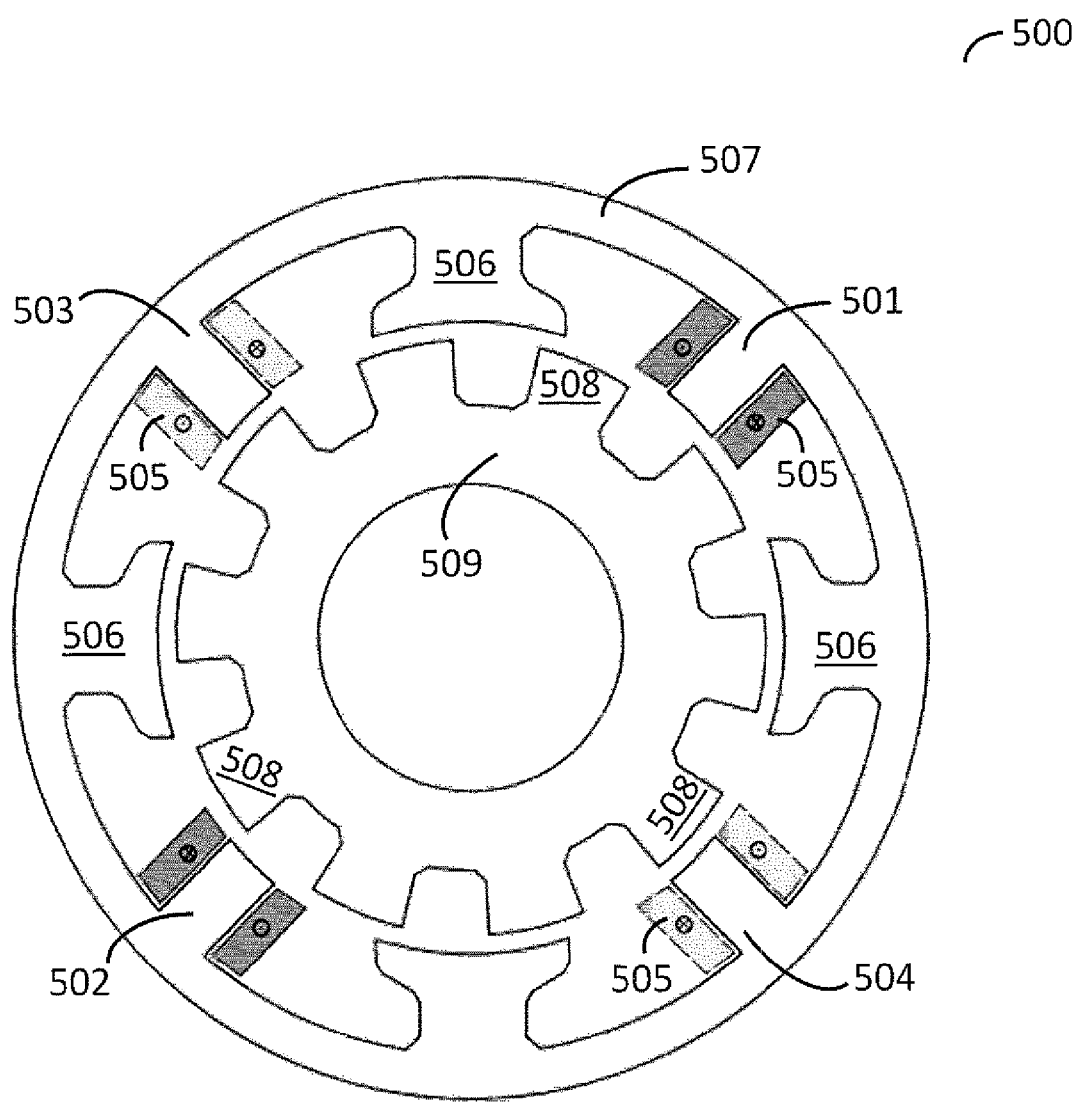
FIG. 5 illustrates a related art SRM having four excitation poles, two poles for each of two phases.
Figure 15:
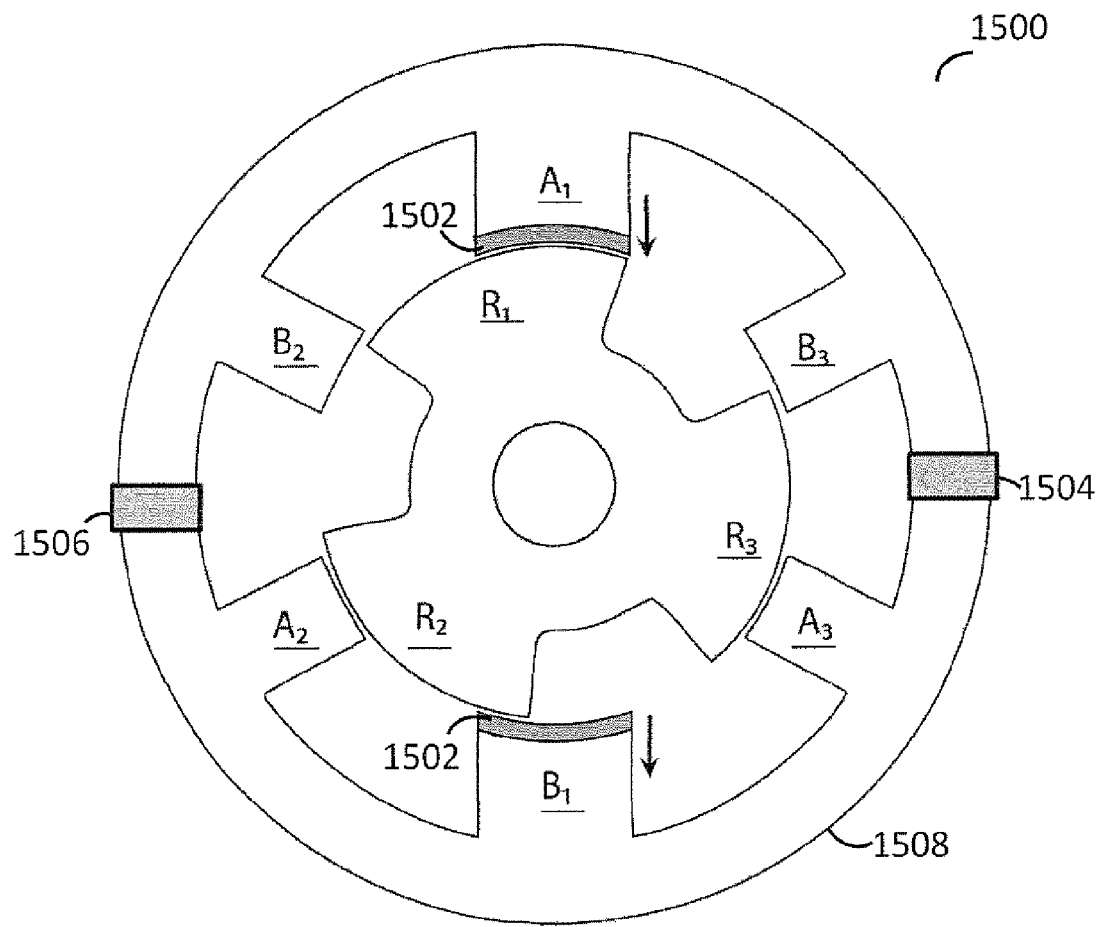
FIG. 15 illustrates a modification of the machine illustrated in FIG. 14 in which PMs are disposed on two stator pole faces.

FIG. 15 illustrates a modification of the machine illustrated in FIG. 14 in which PMs are disposed on two stator pole faces. More specifically, machine 1500 has PMs 1502 disposed on the faces of stator poles A1 and B1. Components 1504 and 1506 may be either permanent magnets, such as are illustrated in FIG. 1, or windings. Components 1504 and 1506 prevent flux reversals due to the flux generated by: (1) the permanent magnets or (2) exciting the stator back windings. Note that the polarities, north to south, of PMs 1502 are indicated by arrows in FIG. 15, with the head of the arrow indicating north and the tail of the arrow indicating south.

Figure 16:
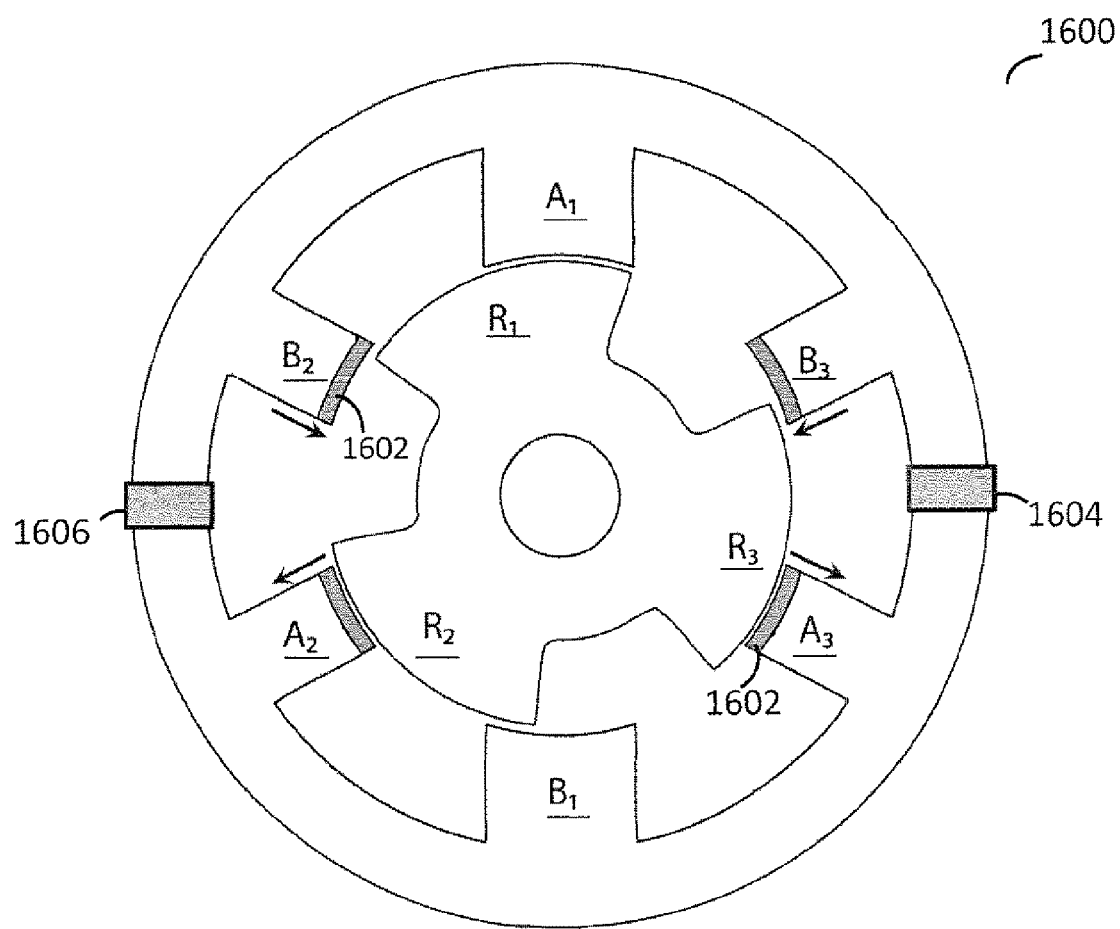
FIG. 16 illustrates a modification of the machine illustrated in FIG. 14 in which PMs are disposed on four stator pole faces.

FIG. 16 illustrates a modification of the machine illustrated in FIG. 14 in which PMs are disposed on four stator pole faces. More specifically, PMs 1602 are disposed on the faces of stator poles A2, A3 and B2, B3. The structure of machine 1500, in which PMs 1502 are disposed on stator poles A1 and B1, is magnetically equivalent to the structure of machine 1600, in which PMs 1602 are disposed on stator poles A2, A3, B2, and B3, as the flux encounters the same reluctance. Components 1604 and 1606 may be either permanent magnets, such as are illustrated in FIG. 1, or windings. Components 1604 and 1606 prevent flux reversals due to the flux generated by: (1) the permanent magnets or (2) exciting the stator back windings.

PMs 1602 do not require extensive bracing support to stay on the faces of poles A2, A3, B2, and B3. The placement of PMs 1602 is preferably near to the faces of stator poles A2, A3, B2, and B3, so as to minimize the leakage flux within PMs 1602.

Figure 17:
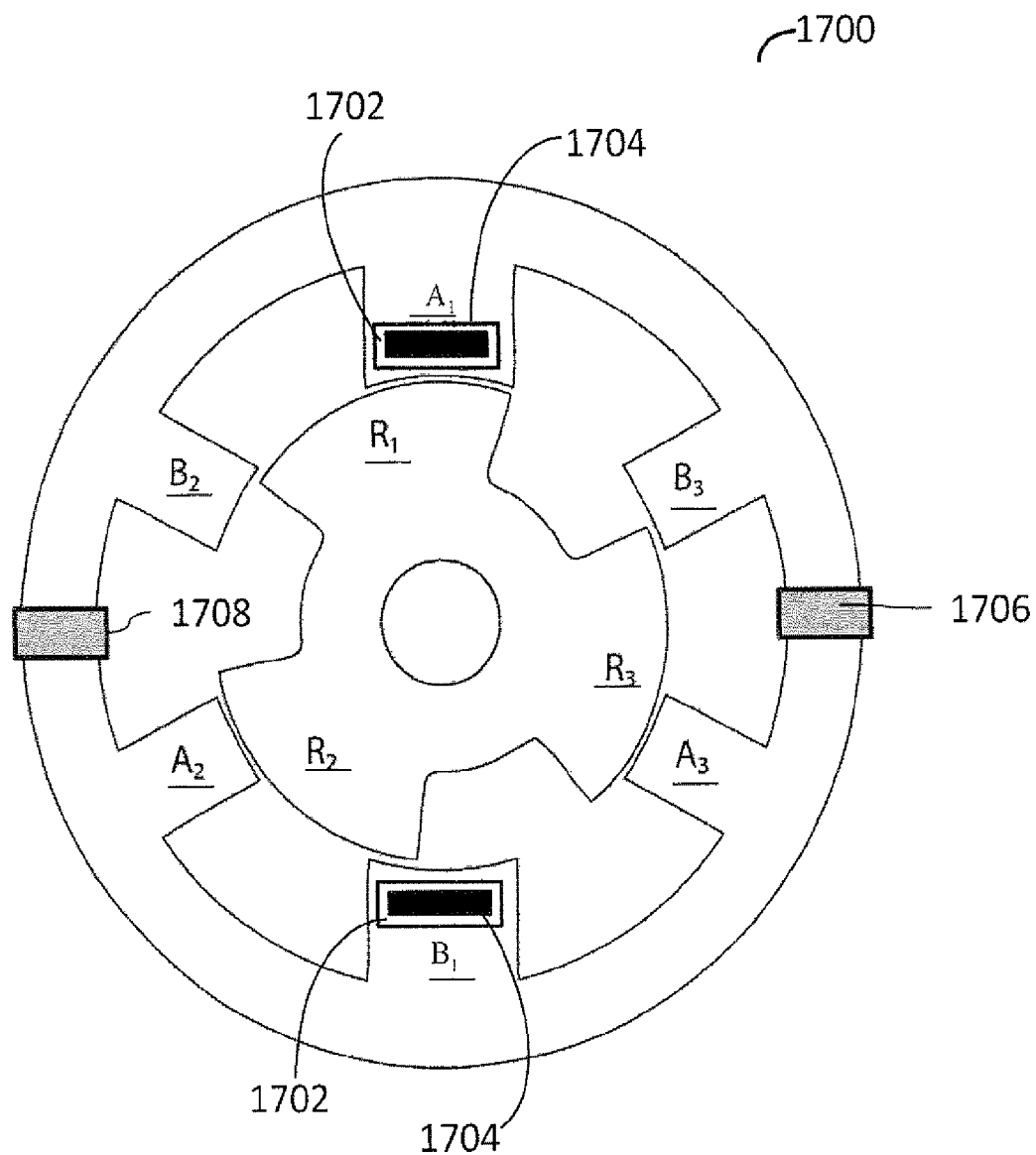
FIG. 17 illustrates a modification of the machine illustrated in FIG. 14 in which PMs are disposed internally within stator poles.

FIG. 17 illustrates a modification of the machine illustrated in FIG. 14 in which PMs are disposed internally within stator poles A1 and B1. As with the placement of PMs 1602 in FIG. 16, PMs 1702 in FIG. 17 are preferably mounted within stator poles A1 and B1 near to the faces of the poles. A slot 1704 for mounting PM 1702 within each of stator poles A1, B2 is big enough to embed PM 1702, but PM 1702 is preferably wedged or glued so that it does not move within the slot. Components 1706 and 1708 may be either permanent magnets, such as are illustrated in FIG. 1, or windings. Components 1706 and 1708 prevent flux reversals due to the flux generated by: (1) the permanent magnets or (2) exciting the stator back windings.

Machines 1500, 1600, and 1700 each have two phases and employ 6-stator and 3-rotor poles and proper winding polarities so as to prevent flux reversals in the stator back iron. The PMs illustrated in FIGS. 15-17 may be arranged either on the larger poles or on the smaller poles for torque enhancement. This two-phase, 6-stator and 3-rotor pole arrangement is extendable to multiphase machines with greater than two phases.

Machines 1500, 1600, and 1700 and multiphase machines do not require PM disposed on the common poles to achieve torque enhancement and operation that is free of flux reversal; instead, windings can be placed on the stator back iron between stator poles A2 and B2 and between stator poles A3 and 133 of machines 1500, 1600, 1700 to produce electromagnetically equivalent PM flux. And windings disposed on the back iron may be used as inductors for power factor correction.

The foregoing has been a detailed description of possible embodiments of the invention. Other embodiments of the invention will be apparent to those skilled in the art from consideration of the specification and practice of the invention. Accordingly, it is intended that this specification and its disclosed embodiments be considered as exemplary only, with a true scope and spirit of the invention being indicated by the following claims.

What is claimed is:

1. A stator comprising:
 a plurality of excitation poles, each pole of the plurality of excitation poles having an inductive winding disposed thereon;
 a common pole having a plurality of side surfaces, an end face, and a permanent magnet disposed on the end face, wherein the common pole does not have an inductive winding disposed thereon and wherein the end face is coupled between at least two side surfaces of said plurality of side surfaces such that the end face is positioned to be adjacent to a rotor when a rotor is positioned for rotation by the stator; and
 a stator back that electromagnetically interconnects the common pole and the plurality of excitation poles.

2. The stator of claim 1, wherein the stator back interconnecting the common pole and the plurality of excitation poles is arc-shaped.

3. The stator of claim 1, wherein the stator back interconnecting the common pole and the plurality of excitation poles is bar-shaped.

4. The stator of claim 1, wherein the stator back interconnecting the common pole and the plurality of excitation poles has a right-angle bend in a portion between two poles of the plurality of excitation poles.

5. A stator comprising:
 a plurality of poles, wherein each pole of the plurality of poles has an inductive winding disposed thereon, each pole of the plurality of poles has a plurality of side surfaces, an end face, and a permanent magnet is disposed on the end face of at least one pole and fewer than all poles of the plurality of poles, wherein the end face is coupled between at least two side surfaces of the plurality of side faces such that the end face is positioned adjacent a rotor when the rotor is positioned for rotation by the stator, and wherein the inductive winding disposed on the poles without a permanent magnet comprise excitation windings and the windings disposed on the poles with a permanent magnet comprise power factor correction windings; and
 a stator back that electromagnetically interconnects the poles.

6. A switched reluctance machine (SRM) having N excitation phases, where N is an integer greater than 0, the SRM comprising:
 a rotor; and
 a stator comprising:
  a plurality of stator poles associated with each excitation phase of the N excitation phases, each of the excitation phases comprises stator poles of a first type and a second type, each stator pole having an inductive winding disposed thereon for receiving current of the associated excitation phase, each stator pole having a plurality of side surfaces, and an end face, wherein the end face is coupled between at least two side surfaces of the of the plurality of side surfaces such that the end face is adjacent the rotor;
  for each excitation phase of the N excitation phases, a first permanent magnet disposed on the end face of the first type of stator poles associated with the excitation phase, wherein the second type of stator poles does not include a permanent magnet; and
  a stator back that electromagnetically interconnects all of the stator poles.

7. The SRM of claim 6, wherein N is greater than 1.

8. The SRM of claim 6, further comprising:
 a plurality of second permanent magnets disposed within the stator back, each second permanent magnet of the plurality of second permanent magnets positioned between two of the poles of the plurality of poles associated with an excitation phase of the N excitation phases, wherein
 for each of the second magnets, one of the two poles is the first type of stator pole and the other of the two poles is the second type of stator pole.

9. The SRM of claim 6, further comprising:
 a plurality of stator back windings disposed around the stator back, each stator back winding of the plurality of stator back windings positioned between two of the poles of the plurality of poles associated with an excitation phase of the N excitation phases, wherein
 for each of the stator back windings, one of the two poles is the first type of stator pole and the other of the two poles is the second type of stator pole.

10. The SRM of claim 6, wherein the rotor includes steel laminations, and does not include windings or magnets.

11. The SRM of claim 6, wherein the first type of stator poles has a larger cross-sectional area than the second type of stator poles, and wherein the inductive windings disposed on the first type of stator poles include more winding turns than the inductive windings disposed on the second type of stator poles.

12. The SRM of claim 6, wherein the first type of stator poles has a smaller cross-sectional area than the second type of stator poles, and wherein the inductive windings disposed on the first type of stator poles include fewer winding turns than the inductive windings disposed on the second type of stator poles.

13. A switched reluctance machine comprising:
a stator comprising:
a plurality of excitation poles, each excitation pole of the plurality of excitation poles including an inductive winding disposed thereon;
a plurality of common poles, each common pole of the plurality of common poles including a plurality of side surfaces, an end face coupled between at least two side surfaces of the plurality of side surfaces, and a permanent magnet disposed on the end face, and not having an inductive winding disposed thereon; and
a stator back that electromagnetically interconnects the common poles and each excitation pole; and
a rotor that cooperates electromagnetically with the stator, wherein:
the end face of each common pole is adjacent the rotor; and
the plurality of excitation poles and the plurality of common poles are disposed around the stator with respect to one another such that when unidirectional currents: (a) are passed through the inductive windings to induce fluxes in the same radial direction from the rotor to the excitation poles or (b) are not passed through the inductive windings:
the fluxes flowing through the stator are unidirectional and never reverse direction,
the fluxes flowing through the common poles are unidirectional and never reverse direction, and
the induced fluxes and the fluxes generated by the permanent magnets are additive, without a negating effect on one another.

14. A switched reluctance machine (SRM) having N phases, where N is an integer greater than 0, the SRM comprising:
a stator comprising:
for each phase, four excitation poles, each excitation pole having an inductive winding disposed thereon, wherein the inductive windings for a pair of the excitation poles are configured to produce fluxes through their respective excitation poles in a direction opposite to that produced by the inductive windings for the other pair of the excitation poles when a common current is passed through the inductive windings of the phase;
a plurality of common poles, each common pole of the plurality of common poles having a plurality of side surfaces, an end face coupled between at least two side surfaces of the plurality of side surfaces, and a permanent magnet disposed on its end face and not having an inductive winding disposed thereon, wherein the number of common poles is equal to the number of excitation poles; and
a stator back that electromagnetically interconnects the common poles and the excitation poles; and
a rotor that cooperates electromagnetically with the stator, wherein:
the end face of each common pole is adjacent the rotor;
the flux directions are determined with respect to a radial direction of the excitation poles toward the rotor; and
the excitation poles and the common poles are disposed around the stator with respect to one another such that when the inductive windings of one phase are excited by passing an alternating current through phase's inductive windings:
the fluxes generated by the excited inductive windings and the fluxes generated by the permanent magnets are additive, without a negating effect on one another, for each direction the alternating current flows, and
flux reversal through the common poles does not occur.

15. The SRM of claim 14, wherein the number of common poles is eight and the common poles and the excitation poles are disposed around the stator such that the net normal forces acting on the SRM are zero when the alternating current excites a phase.

16. A method of operating a switched reluctance machine (SRM), the SRM comprising: (a) a rotor, (b) a stator having multiple stator poles, each of which has an inductive winding disposed thereon, a plurality of side surfaces, and an end face coupled between at least two side surfaces of the plurality of side surfaces, wherein at least one and fewer than all of the stator poles has a permanent magnet disposed on its end face, the end face of each stator pole is adjacent the rotor, and the inductive windings disposed on the poles without a permanent magnet comprise excitation windings and the windings disposed on the poles with a permanent magnet comprise power factor correction (PFC) windings; and (c) a stator back that electromagnetically interconnects the stator poles, the method comprising:
inducing flux within the SRM by passing current through one or more of the excitation windings; and
inducing flux within the SRM by passing current through one or more of the PFC windings to correct a power factor applied to the SRM or enhance torque production of the SRM.

17. A method of operating a switched reluctance machine (SRM) having N excitation phases, where N is an integer greater than 0, the SRM comprising: (a) multiple stator poles associated with each of the N excitation phases, each stator pole having an inductive winding disposed thereon for receiving current of the associated excitation phase, each stator pole having a plurality of side surfaces and an end face coupled between at least two side surfaces of the plurality of side surfaces, wherein the end face of each stator pole is adjacent a rotor; (b) for each of the N excitation phases, a first permanent magnet disposed on the end face of at least one and fewer than all of the stator poles associated with the excitation phase; (c) a stator back that electromagnetically interconnects all of the stator poles; and (d) a plurality of stator back windings disposed around the stator back, each stator back winding of the plurality of stator back windings positioned between two stator poles of the plurality of stator poles associated with an excitation phase of the N excitation phases, wherein for each stator back winding of the plurality of stator back windings, one stator pole of the two stator poles has the first magnet disposed thereon and the other stator pole of the two stator poles does not have a first magnet disposed thereon, the method comprising:

exciting one phase of the SRM by passing current through the inductive windings disposed on the stator poles associated with the phase; and exciting the stator back windings by passing current through them to correct a power factor of the SRM.

* * * * *